United States Patent
Shao

(10) Patent No.: US 11,546,520 B2
(45) Date of Patent: Jan. 3, 2023

(54) SYSTEMS AND METHODS FOR EXPOSURE CONTROL

(71) Applicant: ZHEJIANG DAHUA TECHNOLOGY CO., LTD., Zhejiang (CN)

(72) Inventor: Yiyi Shao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/330,382

(22) Filed: May 25, 2021

(65) Prior Publication Data

US 2021/0281735 A1 Sep. 9, 2021

Related U.S. Application Data

(63) Continuation of application No. PCT/CN2018/125289, filed on Dec. 29, 2018.

(51) Int. Cl.
*H04N 5/235* (2006.01)
*G06V 10/56* (2022.01)

(52) U.S. Cl.
CPC ........... *H04N 5/2353* (2013.01); *G06V 10/56* (2022.01)

(58) Field of Classification Search
CPC .............. H04N 5/2353; H04N 5/2356; H04N 5/35536; H04N 1/4074; G06T 2207/10144; G06T 2207/10024
See application file for complete search history.

(56) References Cited

U.S. PATENT DOCUMENTS

| | | | |
|---|---|---|---|
| 2004/0184673 A1 | 9/2004 | Watanabe | |
| 2005/0270412 A1* | 12/2005 | Kamon | H04N 5/235 348/E5.041 |
| 2007/0177050 A1 | 8/2007 | Xiao et al. | |
| 2008/0285816 A1 | 11/2008 | Kim et al. | |
| 2009/0180684 A1* | 7/2009 | Tani | G06V 20/693 382/162 |

(Continued)

FOREIGN PATENT DOCUMENTS

| | | |
|---|---|---|
| CN | 1752792 A | 3/2006 |
| CN | 101304489 A | 11/2008 |

(Continued)

OTHER PUBLICATIONS

Li, Tong et al., An Auto Exposure Control Algorithm Based on Lane Recognition for on-board Camera, 2015 IEEE Intelligent Vehicles Symposium (IV), 851-856, 2015.

(Continued)

*Primary Examiner* — Ahmed A Berhan
(74) *Attorney, Agent, or Firm* — Metis IP LLC

(57) ABSTRACT

An imaging control method is provided. The method may include obtaining a current image generated based on an exposure parameter, wherein the current image includes a plurality of pixels; determining a plurality of target pixels or target pixel groups from at least portion of the plurality of pixels; determining a statistic representation based on target pixels or target pixel groups; determining a characteristic feature based on the statistic representation; and, updating the exposure parameter, based on the characteristic feature, to generate an updated image.

18 Claims, 9 Drawing Sheets

(56) References Cited

U.S. PATENT DOCUMENTS

2019/0012776 A1    1/2019    Liu

FOREIGN PATENT DOCUMENTS

| CN | 102427538 B | 11/2013 |
| CN | 107360378 A | 11/2017 |
| CN | 107392870 A | 11/2017 |

OTHER PUBLICATIONS

He, Kaiming et al., Single Image Haze Removal Using Dark Channel Prior, IEEE Transactions on Pattern Analysis and Machine Intelligence, 33(12): 2341-2353, 2011.
The Extended European Search Report in European Application No. 18945017.4 dated Oct. 8, 2021, 8 pages.
International Search Report in PCT/CN2018/125289 dated Sep. 23, 2019, 4 pages.
Written Opinion in PCT/CN2018/125289 dated Sep. 23, 2019, 5 pages.
First Office Action in Chinese Application No. 201880100484.3 dated Jan. 6, 2022, 15 pages.

\* cited by examiner

SYSTEMS AND METHODS FOR EXPOSURE CONTROL

CROSS-REFERENCE TO RELATED APPLICATIONS

This application is a continuation of International Patent Application No. PCT/CN2018/125289, filed on Dec. 29, 2018, the contents of each of which are hereby incorporated by reference.

TECHNICAL HELD

The present disclosure generally relates to image capture, and more particularly relates to systems and methods for automatic exposure control based on the dark channel.

BACKGROUND

Magnification of surveillance cameras is getting higher nowadays. If the camera does not limit the size of the aperture at high magnification, the captured image would be foggy. If the aperture is too small, the quality of images may be sacrificed. Therefore, it is desirable to provide methods and systems for automatic aperture control ensure quality of the captured image.

SUMMARY

In an aspect of the present disclosure, an imaging control method is provided. The method may include obtaining a current image generated based on an exposure parameter, wherein the current image includes a plurality of pixels; determining a plurality of target pixels or target pixel groups from at least portion of the plurality of pixels; determining a statistic representation based on target pixels or target pixel groups; determining a characteristic feature based on the statistic representation; and, updating the exposure parameter, based on the characteristic feature, to generate an updated image.

In some embodiments, a pixel may include a multiple pixel values corresponding to different color channels, and the statistic representation may be related to a minimum value of the multiple pixel values.

In some embodiments, determining the statistic representation may include for each of the target pixel groups, determining a plurality of average pixel values corresponding to a plurality of different color channels, wherein for a target pixel group, the target channel value is the minimum value among the plurality of average pixel values of the target pixel group.

In some embodiments, the exposure parameter may include at least one of an aperture of an image capture device, a shutter of the image capture device, a parameter related to photosensibility of the image capture device, or an exposure value of the image capture device.

In some embodiments, the statistic representation may be a histogram.

In some embodiments, the characteristic feature may relate to a peak of the histogram.

In some embodiments, updating the exposure parameter based on the characteristic feature to generate an updated image may include changing the exposure parameter to make the characteristic feature within a preset range.

In some embodiments, changing the exposure parameter to make the characteristic feature within a preset range may include determining whether the characteristic feature satisfies a first condition; in a determination that the characteristic feature does not satisfy the first condition, reducing the exposure parameter based on an optical metric.

In some embodiments, changing the exposure parameter to make the characteristic feature within a preset range may further include determining whether the characteristic feature satisfies a second condition; in a determination that the characteristic feature does not satisfy the second condition, increasing the exposure parameter based on the optical metric.

In some embodiments, updating the exposure parameter is an iteration process, and the method may further include updating the exposure parameters based on a difference between a first statistic representation of a first iteration and a second statistic representation of a second iteration.

In another aspect of the present disclosure, a system configured to control imaging process is provided. The system may include at least one non-transitory storage medium including a set of instructions; and at least one processor in communication with the at least one non-transitory storage medium. When executing the set of instructions, the at least one processor may be configured to direct the system to: obtain a current image generated based on an exposure parameter, wherein the current image includes a plurality of pixels; determine a plurality of target pixels or target pixel groups from at least portion of the plurality of pixels; determine a statistic representation based on target pixels or target pixel groups; determine a characteristic feature based on the statistic representation; and, update the exposure parameter, based on the characteristic feature, to generate an updated image.

In another aspect of the present disclosure, a non-transitory computer readable medium is provided. The non-transitory computer readable medium may include executable instructions that, when executed by at least one processor, cause the at least one processor to effectuate a method comprising: obtaining a current image generated based on an exposure parameter, wherein the current image includes a plurality of pixels; determining a plurality of target pixels or target pixel groups from at least portion of the plurality of pixels; determining a statistic representation based on target pixels or target pixel groups; determining a characteristic feature based on the statistic representation; and, updating the exposure parameter, based on the characteristic feature, to generate an updated image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are preset forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a" "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
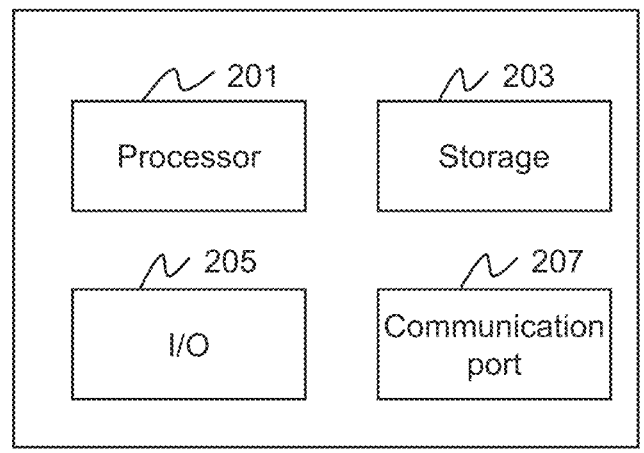
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts, Software modules/units/blocks configured for execution on computing devices (e.g., processor 201 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The following description is provided with reference to systems and methods for automatic exposure. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

The present disclosure relates to systems and methods for exposure control in real time based on a statistic representation of an image. One aperture control method is to pre-calibrate the aperture size value of the camera under various focal lengths and save them into a lookup table. Due to the batch difference of the camera lens, it is necessary to calibrate all the lenses to obtain a look-up table to achieve optimal control. According to an aspect of the present disclosure, an electronic device, such as a camera, that implementing the systems and methods herein may obtain a current image and determine a dark channel histogram of the current image. The electronic device may automatically adjust the aperture size to control a peak position of the dark channel histogram within a predetermined range to ensure the quality of the image.

Figure 1:
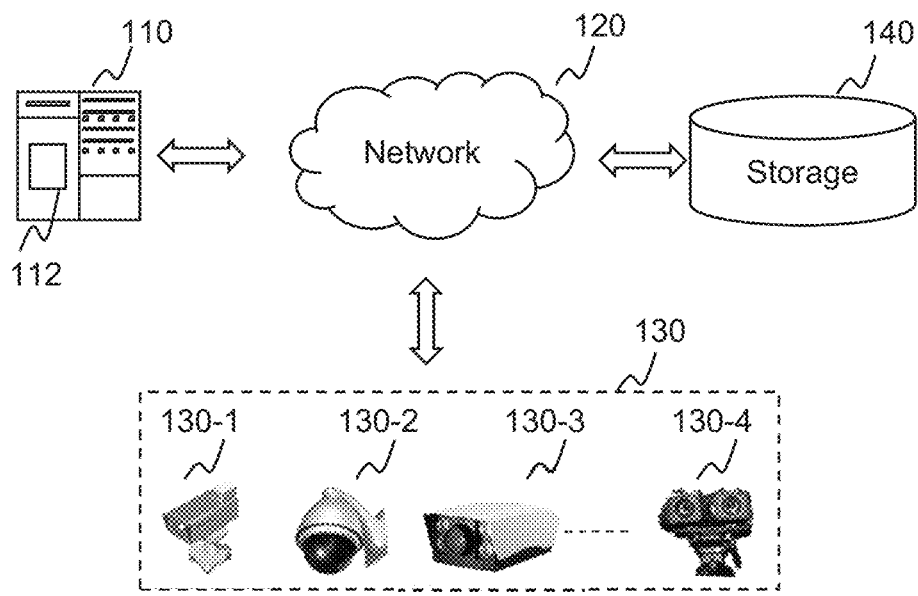
FIG. 1 illustrates a schematic diagram of an exemplary image acquisition system 100 according to some embodiments of the present disclosure.

FIG. 1 illustrates a schematic diagram of an exemplary image acquisition system 100 according to some embodiments of the present disclosure. As shown in FIG. 1, the image acquisition system 100 may include a server 110, a network 120, an image acquisition device 130, and a storage 140. The image acquisition system 100 may be used in various fields including, for example, photography, filming, monitoring, and detection.

The server 110 may include a processing engine 112. The processing engine 112 may process information and/or data relating to the image acquisition system 100 to perform one or more functions described in the present disclosure. For example, the processing engine 112 may determine the dark channel histogram of an image obtained from the image acquisition device 130. As another example, the processing engine 112 may determine one or more exposure parameters based on dark channel histogram.

In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server 110 may be a single server, or a server group. The server group may be centralized, or distributed (e.g., server 110 may be a distributed system). In some embodiments, the server 110 may be local or remote. For example, the server 110 may access information and/or data stored in the image acquisition device 130, and/or the storage 140 via the network 120. As another example, the server 110 may be directly connected to the image acquisition device 130, and/or the storage 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

The network 120 may include any suitable network that can facilitate exchange of information and/or data for the image acquisition system 100. In some embodiments, one or more components in the image acquisition system 100 (e.g., the server 110, the image acquisition device 130, and the storage 140) may send information and/or data to other component(s) in the image acquisition system 100 via the network 120. For example, the server 110 may obtain/acquire an image from the image acquisition device 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

The image acquisition device 130 may be and/or include any suitable device that is capable of acquiring image data. Exemplary image acquisition device 130 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 130 may include a gun camera 130-1, a dome camera 130-2, an integrated camera 130-3, a binocular camera 130-4, a monocular camera, etc. In some embodiments, the camera may be a visible light camera or a thermal imaging camera.

Image data may include an image, or any data about an image, such as values of one or more pixels (or referred to as pixel values) of an image (e.g., luma, color channel values, gray values, intensities, chrominance, contrast, etc. of one or more pixels of an image), audio information, timing information, location data, etc. In some embodiments, the image acquisition device 130 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

In some embodiments, the image acquisition device 130 may have one or more exposure modes. Exemplary exposure modes may include an auto exposure mode, a gain priority mode, a shutter priority mode, an aperture priority mode, an anti-ghosting mode, or the like, or any combination thereof. The image acquisition device 130 in different exposure modes may have the same operation values with respect to the exposure parameter(s) or different operation values with respect to the exposure parameter(s). Exemplary exposure parameters may include a gain, a shutter speed, an aperture size, a sensitivity to light, or the like, or any combination thereof. The exposure mode and the exposure parameter of the image acquisition device 130 may be set manually or automatically. Merely by way of example, the exposure mode of the image acquisition device 130 may be switched by a user. As another example, the image acquisition device 130 may adjust its exposure mode or the operation value(s) with respect to one or more exposure parameters automatically based on an environmental condition (e.g., the brightness, etc.) when taking a picture.

In some embodiments, the image acquisition device 130 may include a processing unit (not shown in FIG. 1). The processing unit may process information and/or data relating to the image acquisition device 130 to perform one or more functions described in the present disclosure. Merely by way of example, the processing unit may control an aperture size of a camera based on a dark channel histogram. In some embodiments, the processing unit may be implemented on a computing device 200 having one or more components illustrated in FIG. 2 in the present disclosure.

In some embodiments, the image data acquired by the image acquisition device 130 may be displayed on a terminal (not shown in FIG. 1). The terminal may include a tablet computer, a laptop computer, a mobile phone, a personal digital assistance (PDA), a smart watch, a point of sale (POS) device, a virtual reality (VR), an augmented reality (AR), an onboard computer, an onboard television, a wearable device, or the like, or any combination thereof.

The storage 140 may store data and/or instructions. The data and/or instructions may be obtained from, for example, the server 110, the image acquisition device 130, and/or any other component of the image acquisition system 100. In some embodiments, the data may include operation value(s) of one or more exposure parameters of an exposure mode, a correspondence table of reference luma values and corresponding groups of operation values with respect to a set of exposure parameters, a normalized correspondence table of reference luma values and corresponding groups of operation values with respect to the set of exposure parameters, a modified correspondence table of reference luma values and corresponding groups of operation values with respect to the set of exposure parameters, settings information (e.g., user setting information), image data about one or more images (e.g., image pixel values, time information, location information, etc.), or the like, or any combination thereof.

In some embodiments, the storage 140 may store data and/or instructions that the server 110 may execute or use to perform exemplary methods described in the present disclosure. In some embodiments, storage 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components in the image acquisition system 100 (e.g., the server 110, the image acquisition device 130, etc.), One or more components in the image acquisition system 100 may access the data or instructions stored in the storage 140 via the network 120. In some embodiments, the storage 140 may be directly connected to or communicate with one or more components in the image acquisition system 100 (e.g., the server 110, the image acquisition device 130, etc.). In some embodiments, the storage 140 may be part of the server 110 or the image acquisition device 130.

In some embodiments, one or more components in the image acquisition system 100 (e.g., the server 110, the image acquisition device 130, etc.) may have a permission to access the storage 140, In some embodiments, one or more components in the image acquisition system 100 may read and/or modify information relating to the image when one or more conditions are met. For example, the server 110 or the image acquisition device 130 may read and/or modify operation value(s) of one or more exposure parameters in various exposure modes.

It should be noted that the above description is merely provided for the purposes of illustration, and not intended to limit the scope of the present disclosure. For persons having ordinary skills in the art, multiple variations and modifications may be made under the teachings of the present disclosure. For example, the image acquisition system 100 may include one or more terminals. As another example, the processing engine 112 may be integrated into the image acquisition device 130. However, those variations and modifications do not depart from the scope of the present disclosure.

FIG. 2 is a schematic diagram illustrating exemplary hardware and/or software components of an exemplary computing device 200 on which the image acquisition system 100 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (e.g., program code) and perform functions of the image acquisition system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may determine one or more exposure parameters of the image acquisition device 130. In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 in the present disclosure may also include multiple processors, and thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from the server 110, the image acquisition device 130, and/or any other component of the image acquisition system 100. In some embodiments, the storage 203 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for the processing engine 112 for generating a correspondence table of reference luma values and corresponding groups of operation values with respect to a set of exposure parameters.

The I/O 205 may input and/or output signals, data, information, etc. In some embodiments, the I/O 205 may enable a user interaction with the processing engine 112. In some embodiments, the I/O 205 may include or communicate with an input device and an output device to facilitate a communication between the processing engine 112 and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

Figure 3:
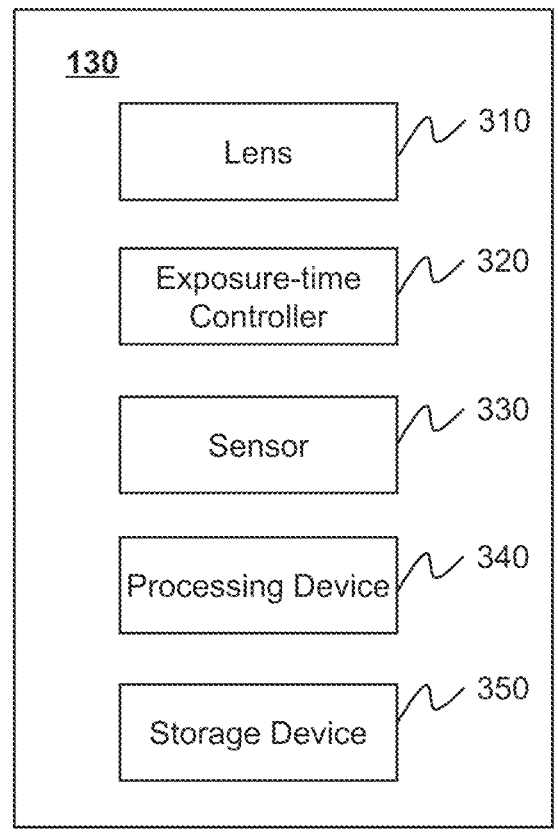
FIG. 3 is a schematic diagram illustrating an exemplary image acquisition device according to some embodiments of the present disclosure.

The communication port 207 may be connected to a network (e.g., the network 120) to facilitate data communications. The communication port 207 may establish connections between the server 110, the image acquisition device 130, and/or any other component of the image acquisition system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port. For example, the communication port 207 may be designed in accordance with the digital imaging and communications in medicine (DICOM) protocol, FIG. 3 is a schematic diagram illustrating an exemplary image acquisition device according to some embodiments of the present disclosure. The image acquisition device 130 may include a lens 310, an exposure-time controller 320, a sensor 330, a processing device 340, and a storage device 350.

The image acquisition device 130 may be a device configured to capture one or more images. As used in this application, an image may be a still image, a video, a stream video, or a video frame obtained from a video. The image may be a three-dimensional (3D) image or a two-dimensional (2D) image. In some embodiments, the image acquisition device 130 may be a digital camera, a video camera, a security camera, a web camera, a smartphone, a tablet, a laptop, a video gaming console equipped with a web camera, a camera with multiple lenses, a camcorder, etc.

The lens 310 may be an optical device that focuses a light beam by means of refraction to form an image. In some embodiments, the lens 310 may include at least one lens. The at least one lens may be configured to intake scenes it is facing at. It may include aperture mechanisms to adjust the aperture of the lens. An aperture of the lens 310 may refer to the size of the hole through which light passes to reach the sensor 330, The larger the aperture is, the more light the lens takes in, and thereby the brighter the image the camera (or the camcorder) (e.g., the image acquisition device 130) produces. The aperture may be adjustable to adjust the amount of light that passes through the lens 310. The focal length of the lens 310 may be adjustable to adjust the coverage of the image acquisition device 130.

The exposure-time controller 320 may be configured to control an exposure time. The exposure time may refer to the length of time when the sensor 330 inside the image acquisition device 130 generates electrical signals. In some embodiments, the exposure-time controller 320 may be a shutter device (e.g., a mechanical shutter) configured to open to allow light to reach the sensor 330 through the lens 310 to make the sensor 330 generate electrical signals when an image is captured. The shutter device may be controlled manually or automatically. The shutter time (e.g., an interval from open to closed) of the shutter device to take pictures of the scenes may be the exposure time. In some embodiments, the sensor 330 does not generate electrical signals without electricity even though light reaches the sensor 330. The exposure-time controller 320 may be an electronic shutter to control the length of time when the sensor 330 is charged with electricity (also referred to as the exposure time). The longer the exposure time is, the more electrical signals the sensor 330 generates, and thereby the brighter the image the camera (or the camcorder) (e.g., the image acquisition device 130) produces.

The sensor 330 may be one or more image sensors or imaging sensors that detects and conveys the scenes taken by the lens 310 into electronic signals of an image (e.g., a digital image). The sensor 330 may include charge coupled device (CCD) and complementary metal-oxide semiconductor (CMOS).

The processing device 340 may be configured to process data and/or information relating to the image acquisition device 130 in the present disclosure. The processing device 340 may be electronically connected to and control the operations of one or more components (e.g., the lens 310, the exposure-time controller 320, the sensor 330) in the image acquisition device 130. For example, the processing device 340 may automatically determine target values of exposure parameters of the image acquisition device 130 such as an exposure time, an exposure gain, and an aperture. As another example, the processing device 340 may automatically adjust the exposure parameters based on the target values of the exposure parameters.

In some embodiments, the processing device 340 may be local or remote. For example, the processing device 340 may communicate with the image acquisition device 130 via wire or wireless connection. As another example, the processing device 340 may be a part of the image acquisition device 130 (as shown in FIG. 1).

The storage device 350 may store data, instructions, and/or any other information. In some embodiments, the storage device 350 may store data obtained from the processing device 340. For example, the storage device 350 may store captured images. In some embodiments, the storage device 350 may store data and/or instructions that the processing device 340 may execute or use to perform exemplary methods described in the present disclosure. For example, the storage device 350 may store data and/or instructions that the processing device 340 may execute or use to perform automatic exposure described in the present disclosure. In some embodiments, the storage device 350 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the storage device 350 may be remote or local. For example, the storage device 350 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. As another example, the storage device 350 may be connected to a network to communicate with one or more other components of the image acquisition device 130 (e.g., the processing device 340). One or more components of the image acquisition device 130 may access the data or instructions stored in the storage device 350 via the network. As still another example, the storage device 350 may be directly connected to or communicate with one or more other components in the image acquisition device 130 (e.g., the processing device 340). The storage device 350 may be part of the image acquisition device 130.

In some embodiments, the image acquisition device 130 may further include an amplifier, an analog to digital (A/D) converter, and a power source (not shown in FIG. 1). The amplifier may be configured to amplify the electrical signals generated by the sensor 330. The magnification of the electrical signals generated by the sensor 330 may be referred to as an exposure gain. The higher the exposure gain takes, the brighter the image the camera (e.g., the image acquisition device 130) produces (a side effect of a higher gain is that the noise is higher as well). The A/D converter may be configured to transform the amplified electrical signals from the amplifier into digital signals. The digital signals may be transformed to the processing device 340 to generate an image. The image may be stored in the storage device 350.

Figure 4:
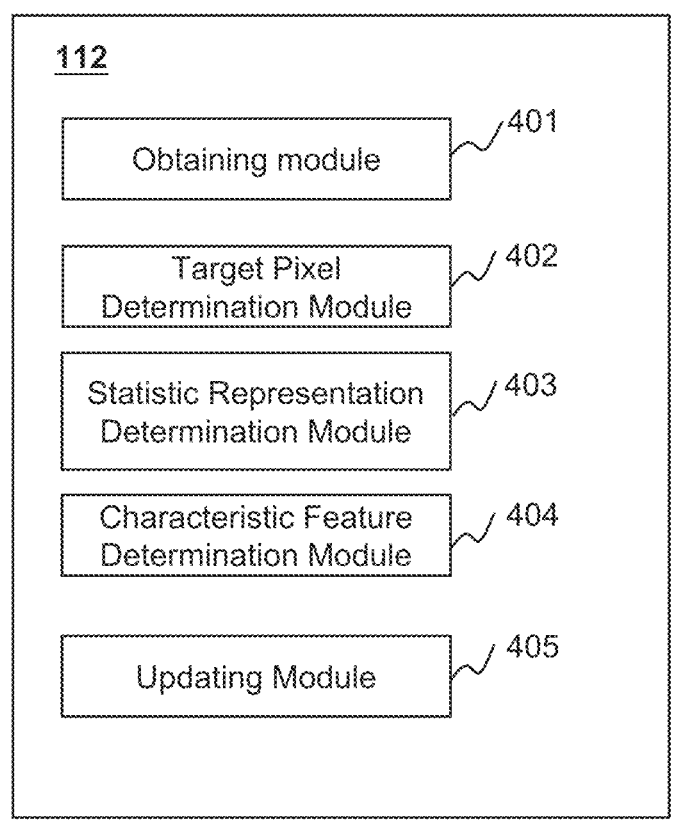
FIG. 4 is a block diagram illustrating an exemplary processing engine or the processing device according to some embodiments of the present disclosure.

FIG. 4 is a block diagram illustrating an exemplary processing engine 112 or the processing device 340 according to some embodiments of the present disclosure. The processing engine 112 or the processing device 340 may include an obtaining module 401, a target pixel determination module 402, a statistic representation determination module 403, a characteristic feature determination module 404, and an updating module 405. At least two components in the processing engine 112 may be connected to or communicated with each other and/or other components in the image acquisition system 100, for example, the storage 140. In some embodiments, the processing engine 112 may be implemented on the computing device 200 illustrated in FIG. 2.

The obtaining module 401 may obtain a current image generated based on an exposure parameter. The current image may be generated by the image acquisition device 130 illustrated in FIG. 3. The current image may be a still image, a video, a stream video, a video frame obtained from a video, or the like, or any combination thereof. The exposure parameter may include an exposure gain parameter, a shutter speed, a focal length of the lens, or an aperture size of the lens.

The current image may be represented by a color model. The color model may include an RGB color model, a CMY color model, a CMYK color model, a YUV color model, an HSV color model, an HLS color model, a YCoCg color model, a CIE XYZ color model, a CIE LUV color model, CIE Lab color models, or the like, or any combination thereof. The color model may include different color channels. For example, the RGB color model may have a red channel, a green channel and a blue channel to represent different colors by combining the different color channels with different brightness.

The target pixel determination module 402 may determine a plurality of target pixels from at least portion of the plurality of pixels of the current image. The target pixel determination module 402 may determine all the pixels of the current image as the target pixels. In some embodiments, to reduce the computing cost, the target pixel determination module 402 may determine a portion of the plurality of pixels of the current image as the target pixels. For example, the target pixel determination module 402 may determine pixels in a certain area of the current image (e.g., a circle area of the current image) as the target image. In some embodiments, to generate a specific statistic representation in subsequent operations, the target pixel determination module 402 may exclude some area of the current image of which brightness is higher or lower than a threshold and determine the rest pixels of the current image as the target pixels. For example, if the current image includes a sky region, the target pixel determination module 402 may exclude the sky area and determine the rest pixels of the current image as the target pixels.

In some embodiments, to reduce the computing cost, the target pixel determination module 402 may determine a plurality of target pixels groups from at least portion of the plurality of pixels of the current image. The target pixel determination module 402 may divide all the pixels of the current image or a portion of the plurality of pixels of the current image into different pixel groups to obtain the plurality of target pixels groups. For each of the pixel group, the target pixel determination module 402 may determine a reference pixel value. The reference pixel value may be determined based on pixel values of pixels within the pixel group. For example, the target pixel determination module 402 may divide the current image into 17×15 pixel groups with 17 pixel groups in row and 15 pixel groups in height. The target pixel determination module 402 may determine all the 17×15 pixel groups as the target pixel groups or a portion of the 17×15 pixel groups as the target pixel groups.

The statistic representation determination module 403 may determine a statistic representation of the current image based on the target pixels or the target pixel groups. In the present disclosure, the statistic representation of the current image may be an evaluation criterion of the quality of the current image. A characteristic feature of the statistic representation may be related to priori information, obtained via empirical investigation, of a plurality of images obtained before the current image. For example, one exemplary embodiment of the statistic representation may be a dark channel histogram. A pixel may include a multiple pixel values corresponding to the different color channels of the color model. A dark channel may be related to a minimum value of the multiple pixel values, and the dark channel histogram may be a histogram of the dark channel of the image (or of the target pixels, or the target pixel groups). Based on a statistic about 5000 outdoor fog-free images, the priori information related to the dark channel may be obtained that about 75 percent of the pixels in the dark channels have zero values and 90 percent of the pixels have values below 35 when the pixels in the sky region are excluded. If the exposure parameter (e.g., the aperture size) of the current image is not limited, the current image may be foggy. Thus, the exposure parameter may be limited based on the dark channel to generate a foggy free image.

The characteristic feature determination module 404 may determine a characteristic feature based on the statistic representation. The characteristic feature may describe a distribution tendency corresponding to the statistic representation. For example, when the statistic representation is a histogram, the characteristic feature histogram may be a peak position of the histogram, and a characteristic feature value may be a pixel value of the peak. For another example, when the statistic representation is the histogram, the characteristic feature histogram may be related to a mean, a median, a maximum or a minimum of the histogram, and a characteristic feature value may be a mean, a median, a maximum or a minimum of pixel value of the histogram. For still another example, when the statistic representation is the histogram, the characteristic feature corresponding to the histogram may be a function describing a shape or a distribution of the histogram (e.g., a Gaussian function or a polynomial, etc.), and the characteristic feature value may be one or more parameters of the function (for example, a variance and/or a mean of the Gaussian function, or a plurality of polynomial coefficients of the polynomial).

The updating module 405 may update the exposure parameter, based on the characteristic feature, to generate an updated image. The updating module 405 may change the exposure parameter to make the characteristic feature within a preset range.

The preset range may include an upper threshold representing an upper limit of the preset range, and a lower threshold representing a lower limit of the preset range. The preset range may be input by a user via a I/O device (e.g., the I/O device). In some embodiments, the updating module 405 may determine the preset range based on geographic information or temporal information related to the current image. Based on the characteristic feature, the updating module 405 may change the exposure parameter, and the acquisition device 130 may generate, based on the changed exposure parameter, the updated image with improved image quality compared to the current image. In some embodiments, the updating module 405 may determine whether the characteristic feature satisfies a first condition (e.g., the characteristic feature value does not exceed the upper limit threshold). In a determination that the characteristic feature does not satisfy the first condition, the updating module 405 may reduce the exposure parameter based on an optical metric (e.g., an equivalent exposure value), The updating module 405 may determine whether the characteristic feature satisfies a second condition (e.g., the characteristic feature value is not under the lower limit threshold). In a determination that the characteristic feature does not satisfy the second condition, the updating module 405 may increase the exposure parameter based on the optical metric.

Figure 5:
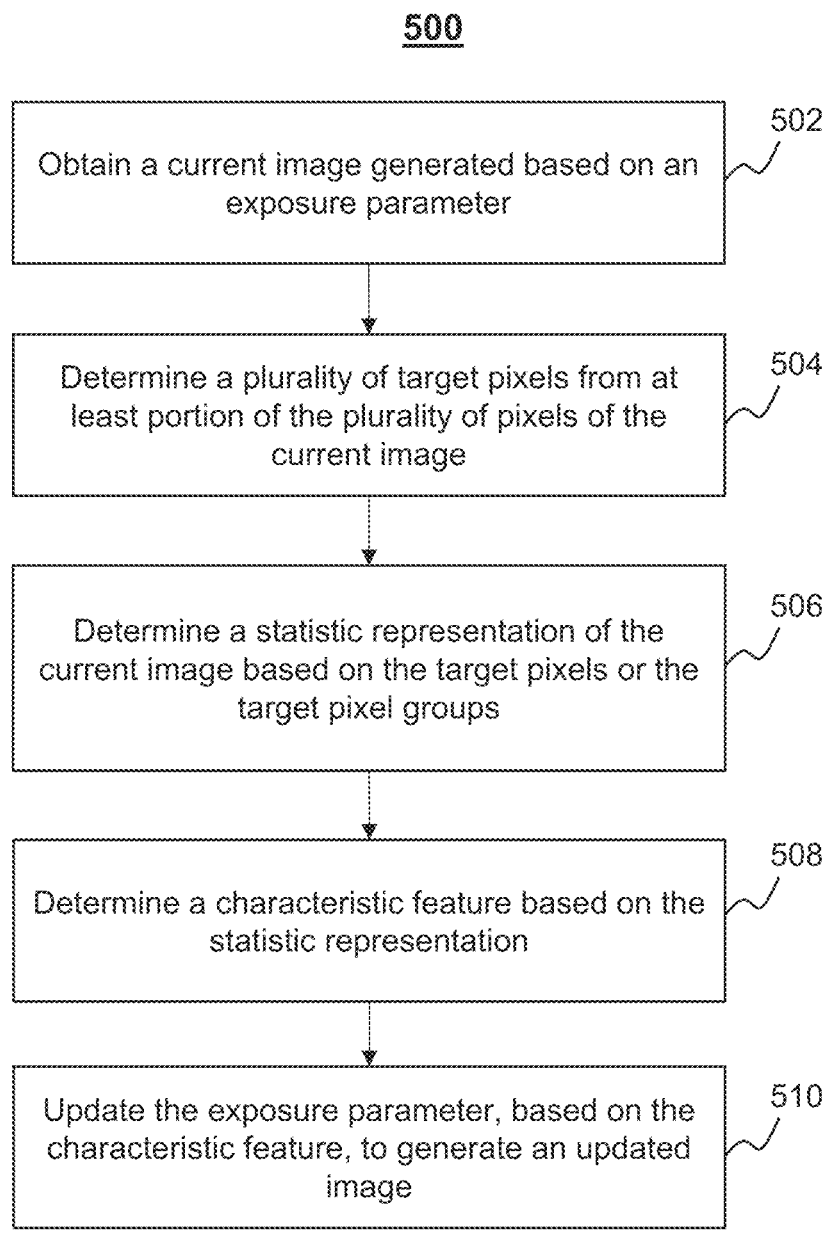
FIG. 5 is a flowchart illustrating an exemplary process for exposure parameter control based on a statistic representation of an image according to some embodiments of the present disclosure.

The process for generating the updated image may be an iterative process. After the updated image is generated, the statistic representation determination module 403 may determine the statistic representation of the updated image, and the characteristic feature determination module 404 may determine the characteristic feature of the updated image7, then the updating module 405 may determine whether the characteristic feature of the updated image is within the preset range. The updating module 405 may iteratively update the exposure parameter and generate the updated image until the characteristic feature is within the preset range. To prevent an infinite iteration, the process may terminate the iterative process when a number of iteration exceeds a threshold (e.g., 15). In some embodiments, the updating module 405 may terminate the iterative process based on a difference between a characteristic feature from a current iteration and a characteristic feature from a last iteration, FIG. 5 is a flowchart illustrating an exemplary process for exposure parameter control based on a statistic representation of an image according to some embodiments of the present disclosure. In some embodiments, the process 500 may be implemented in the processing engine 112 illustrated in FIG. 1 or the processing device 340 illustrated in FIG. 3. For example, the process 500 may be stored in the storage 140, in the storage 203 and/or the storage device 350 as a form of instructions and invoked and/or executed by the processing engine 112 or the processing device 340 (e.g., the processor 201 illustrated in FIG. 2). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the obtaining module 401 may obtain a current image generated based on an exposure parameter. The current image may be generated by the image acquisition device 130 illustrated in FIG. 3. The current image may be a still image, a video, a stream video, a video frame obtained from a video, or the like, or any combination thereof. The exposure parameter may include an exposure gain parameter, a shutter speed, a focal length of the lens, or an aperture size of the lens.

The current image may be represented by a color model. The color model may include an RGB color model, a OMY color model, a CMYK color model, a YUV color model, an HSV color model, an HLS color model, a YCoCg color model, a CIE XYZ color model, a CIE LUV color model, CIE Lab color models, or the like, or any combination thereof. The color model may include different color channels. For example, the RGB color model may have a red channel, a green channel and a blue channel to represent different colors by combining the different color channels with different brightness.

The current image may include a plurality of pixels. A pixel may include a multiple pixel values corresponding to all the different color channels of the color model. For example, a pixel of an RGB image may include multiple pixels values represented as (25, 245, 15), where "25" represents brightness intensity of red color of the pixel, "245" represents brightness intensity of green color of the pixel, and "25" represents brightness intensity of blue color of the pixel. A statistic representation may be determined based on the multiple pixel values of the pixel in subsequent operations.

In 504, the target pixel determination module 402 may determine a plurality of target pixels from at least portion of the plurality of pixels of the current image. A statistic representation may be determined based on the target pixels in subsequent operations. The target pixel determination module 402 may determine all the pixels of the current image as the target pixels. In some embodiments, to reduce the computing cost, the target pixel determination module 402 may determine a portion of the plurality of pixels of the current image as the target pixels. For example, the target pixel determination module 402 may determine pixels in a certain area of the current image (e.g., a circle area of the current image) as the target image. In some embodiments, to generate a specific statistic representation in subsequent operations, the target pixel determination module 402 may exclude some area of the current image of which brightness is higher or lower than a threshold and determine the rest pixels of the current image as the target pixels. For example, if the current image includes a sky region, the target pixel determination module 402 may exclude the sky area and determine the rest pixels of the current image as the target pixels.

In some embodiments, to reduce the computing cost, the target pixel determination module 402 may determine a plurality of target pixels groups from at least portion of the plurality of pixels of the current image. The target pixel determination module 402 may divide all the pixels of the current image or a portion of the plurality of pixels of the current image into different pixel groups to obtain the plurality of target pixels groups. For each of the pixel group, the target pixel determination module 402 may determine a reference pixel value. The reference pixel value may be determined based on pixel values of pixels within the pixel group. For example, the target pixel determination module 402 may divide the current image into 17×15 pixel groups with 17 pixel groups in row and 15 pixel groups in height. The target pixel determination module 402 may determine all the 17×15 pixel groups as the target pixel groups or a portion of the 17×15 pixel groups as the target pixel groups. The statistic representation may be determined based on a plurality of reference pixel values corresponding to the plurality of target pixel groups in subsequent operations.

In 506, the statistic representation determination module 403 may determine a statistic representation of the current image based on the target pixels or the target pixel groups. In the present disclosure, the statistic representation of the current image may be an evaluation criterion of the quality of the current image. A characteristic feature of the statistic representation may be related to priori information, obtained via empirical investigation, of a plurality of images obtained before the current image. For example, one exemplary embodiment of the statistic representation may be a dark channel histogram. As mentioned in Operation 502, a pixel may include a multiple pixel values corresponding to the different color channels of the color model. A dark channel may be related to a minimum value of the multiple pixel values, and the dark channel histogram may be a histogram of the dark channel of the image (or of the target pixels, or the target pixel groups). Based on a statistic about 5000 outdoor fog-free images, the priori information related to the dark channel may be obtained that about 75 percent of the pixels in the dark channels have zero values and 90 percent of the pixels have values below 35 when the pixels in the sky region are excluded. If the exposure parameter (e.g., the aperture size) of the current image is not limited, the current image may be foggy. Thus, the exposure parameter may be limited based on the dark channel to generate a foggy free image.

In 508, the characteristic feature determination module 404 may determine a characteristic feature based on the statistic representation. The characteristic feature may describe a distribution tendency corresponding to the statistic representation. For example, when the statistic representation is a histogram (e.g., the dark channel histogram as described in Operation 506), the characteristic feature histogram may be a peak position of the histogram, and a characteristic feature value may be a pixel value of the peak. For another example, when the statistic representation is the histogram, the characteristic feature histogram may be related to a mean, a median, a maximum or a minimum of the histogram, and a characteristic feature value may be a mean, a median, a maximum or a minimum of pixel value of the histogram. For still another example, when the statistic representation is the histogram, the characteristic feature corresponding to the histogram may be a function describing a shape or a distribution of the histogram (e.g., a Gaussian function or a polynomial, etc.), and the characteristic feature value may be one or more parameters of the function (for example, a variance and/or a mean of the Gaussian function, or a plurality of polynomial coefficients of the polynomial).

In 510, the updating module 405 may update the exposure parameter, based on the characteristic feature, to generate an updated image. The updating module 405 may change the exposure parameter to make the characteristic feature within a preset range. As described in Operation 506 and 508, the characteristic feature of the statistic representation may be related to the priori information, obtained via empirical investigation, of a plurality of images obtained before the current image. For example, about 75 percent of the pixels in the dark channels have zero values and 90 percent of the pixels have values below 35 when the pixels in the sky region are excluded. Thus, for a dark channel, characteristic feature value (i.e., peak position of the dark channel histogram) should be less than 35 and more than 0.

The preset range may include an upper threshold representing an upper limit of the preset range, and a lower threshold representing a lower limit of the preset range. The preset range may be input by a user via a I/O device (e.g., the I/O device), In some embodiments, the updating module 405 may determine the preset range based on geographic information or temporal information related to the current image. Taking the dark channel histogram as an example, if the current image is taking in day time, the updating module 405 may determine the preset range as (A1, A2). If the current image is taking in day time, the updating module 405 may determine the preset range as (B1, B2). The A1 may be bigger than B1, and the A2 may be bigger than B2. If the current image is an image including the sky region, the updating module 405 may determine the preset range as (C1, C2). If the current image is an image not including the sky region, the updating module 405 may determine the preset range as (D1, D2). The C1 may be bigger than D1, and the C2 may be bigger than D2.

In some embodiments, the preset range may be determined based on one or more historical images (i.e., the image generated before the current image by the image acquisition device 130). One or more features of a historical images may be determined. The one or more features may include temporal information of the historical image (e.g., shooting time of the historical image), geographic information of the historical image (e.g., shooting position of the historical image), brightness of the historical image, a histogram of the historical image (e.g., RGB channel histogram, dark channel histogram). Then a trained model may be determined based on the one or more features of the historical images. The trained model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVD), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc. The updating module 405 may determine the preset range based on the trained model and the current image.

Based on the characteristic feature, the updating module 405 may change the exposure parameter, and the acquisition device 130 may generate, based on the changed exposure parameter, the updated image with improved image quality compared to the current image. In some embodiments, the updating module 405 may determine whether the characteristic feature satisfies a first condition (e.g., the characteristic feature value does not exceed the upper limit threshold). In a determination that the characteristic feature does not satisfy the first condition, the updating module 405 may reduce the exposure parameter based on an optical metric (e.g., an equivalent exposure value). The updating module 405 may determine whether the characteristic feature satisfies a second condition (e.g., the characteristic feature value is not under the lower limit threshold). In a determination that the characteristic feature does not satisfy the second condition, the updating module 405 may increase the exposure parameter based on the optical metric.

The process for generating the updated image may be an iterative process. After the updated image is generated, the statistic representation determination module 403 may determine the statistic representation of the updated image according to Operation 506, and the characteristic feature determination module 404 may determine the characteristic feature of the updated image according to Operation 507, then the updating module 405 may determine whether the characteristic feature of the updated image is within the preset range. The updating module 405 may iteratively update the exposure parameter and generate the updated image until the characteristic feature is within the preset range. To prevent infinite iterations, the process may terminate the iterative process when a number of iteration exceeds a threshold (e.g., 15). In some embodiments, the updating module 405 may terminate the iterative process based on a difference between a characteristic feature from a current iteration and a characteristic feature from a last iteration. Detailed description related to the iterative process for generating the updated image may be found in FIG. 7 and the description thereof.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 502 and 504 may be performed at the same time. As another example, 506 and 508 may be integrated into an operation to adjust the imaging device based on the group of operation values of a set of exposure parameters. However, those variations and modifications also fall within the scope of the present disclosure.

Figure 6:
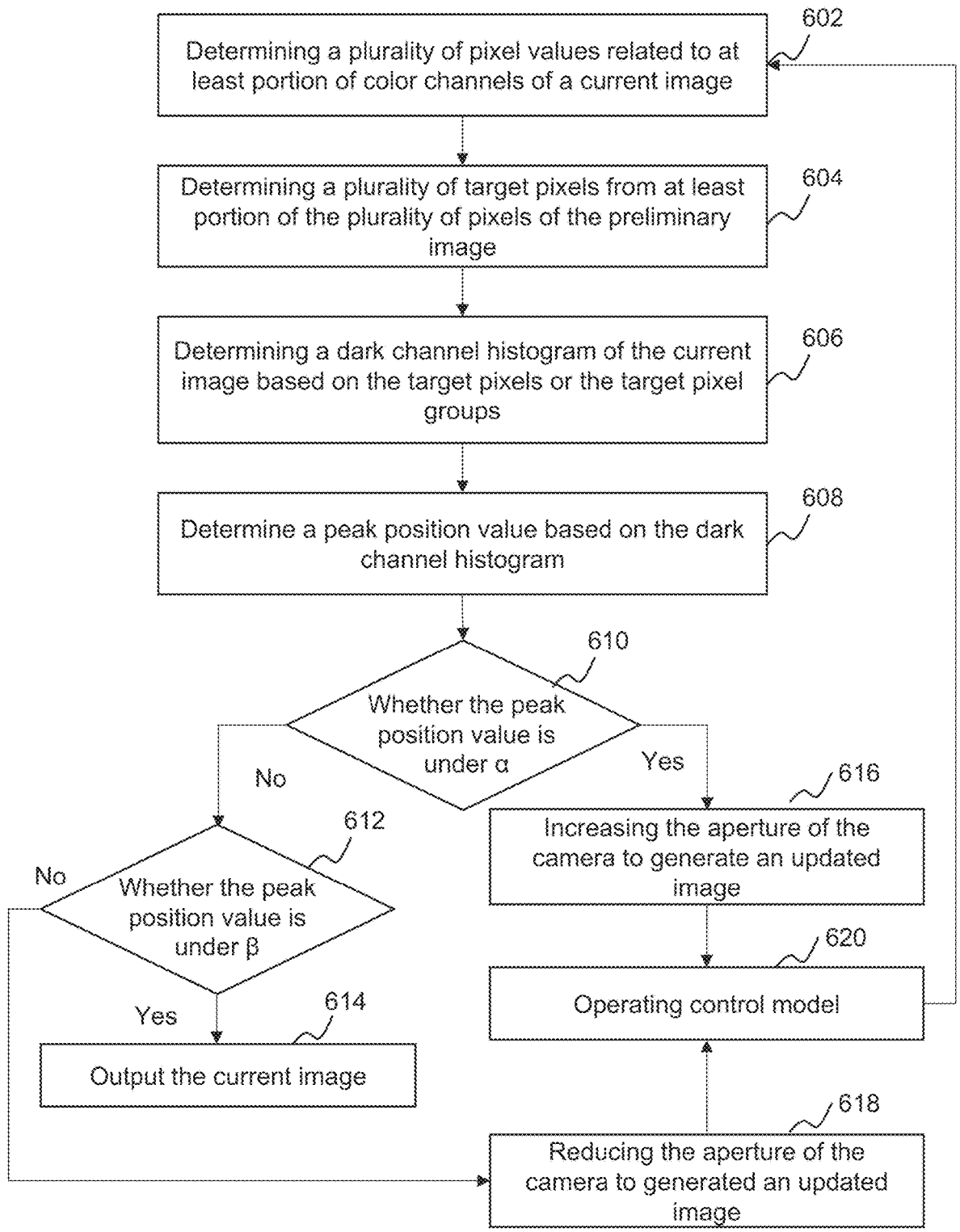
FIG. 6 is a flowchart illustrating an exemplary process for exposure control based on a dark channel histogram of an image according to some embodiments of the present disclosure.

FIG. 6 is a flowchart illustrating an exemplary process for exposure control based on a dark channel histogram of an image according to some embodiments of the present disclosure. In some embodiments, the process 600 may be implemented in the processing engine 112 illustrated in FIG. 1 or the processing device 340 illustrated in FIG. 3. For example, the process 600 may be stored in the storage 140, in the storage 203 and/or the storage device 350 as a form of instructions and invoked and/or executed by the processing engine 112 or the processing device 340 (e.g., the processor 201 illustrated in FIG. 2). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the obtaining module 401 may determine a plurality of pixel values related to at least portion of color channels of a current image. The current image may be represented by a color model. The current image may include a plurality of pixels. Each pixel of the current image may include a multiple pixel values corresponding to all the different color channels of the color model respectively. For example, a current image represented by an RGB color model may include a red channel, a green channel, and a blue channel. A pixel of the RGB image may include at least three pixels values represented as (25, 245, 15), where "25" represents brightness intensity of red color of the pixel, "245" represents brightness intensity of green color of the pixel, and "25" represents brightness intensity of blue color of the pixel.

The current image may be generated by image acquisition device 130. The current image may be a still image, a video, a stream video, a video frame obtained from a video, or the like, or any combination thereof. The exposure parameter may include an exposure gain parameter, a shutter speed, a focal length, or an aperture size of the image acquisition device 130.

The current image may be represented by a color model. The color model may include an RGB color model, a CMY color model, a CMYK color model, a YUV color model, an HSV color model, an HLS color model, a YCoCg color model, a CIE XYZ color model, a CIE LUV color model, CIE Lab Color Models, or the like, or any combination thereof. The color model may include different color channels. For example, the RGB color model may have a red channel, a green channel and a blue channel to represent different colors by combining the different color channels. The current image may include a plurality of pixels. A pixel may include a multiple pixel values corresponding to all the different color channels of the color model. For example, a pixel of an RGB image may include multiple pixels values represented as (25, 245, 15), where "25" represents brightness intensity of red color of the pixel, "245" represents brightness intensity of green color of the pixel, and "25" represents brightness intensity of blue color of the pixel. A dark channel histogram may be determined based on the multiple pixel values of the pixel in subsequent operations.

In 604, the target pixel determination module 402 may determine a plurality of target pixels from at least portion of the plurality of pixels of the current image. A dark channel histogram may be determined based on the target pixels in subsequent operations. The target pixel determination module 402 may determine all the pixels of the current image as the target pixels. In some embodiments, to reduce the computing cost, the target pixel determination module 402 may determine a portion of the plurality of pixels of the current image as the target pixels. For example, the target pixel determination module 402 may determine pixels in a certain area of the current image (e.g., a circle area of the current image) as the target image. In some embodiments, to generate a specific dark channel histogram in subsequent operations, the target pixel determination module 402 may exclude some area of the current image of which a brightness is higher or lower than a threshold and determine the rest pixels of the current image as the target pixels. For example, if the current image is an image including sky area, the target pixel determination module 402 may exclude the sky area and determine the rest pixels of the current image as the target pixels.

In some embodiments, to reduce the computing cost, the target pixel determination module 402 may determine a plurality of target pixels groups from at least portion of the plurality of pixels of the current image. The target pixel determination module 402 may divide all the pixels of the current image or a portion of the plurality of pixels of the current image into different pixel groups to obtain the plurality of target pixels groups. For each of the pixel group, the target pixel determination module 402 may determine a reference pixel value. For example, the target pixel determination module 402 may divide the current image into 17×15 pixel groups with 17 pixel groups in row and 15 pixel groups in height. The target pixel determination module 402 may determine all the 17×15 pixel groups as the target pixel groups or a portion of the 17×15 pixel groups as the target pixel groups. The dark channel histogram may be determined based on a plurality of reference pixel values corresponding to the plurality of target pixel groups in subsequent operations.

In 606, the statistic representation determination module 403 may determine a dark channel histogram of the current image based on the target pixels or the target pixel groups. As mentioned in Operation 602, a pixel may include a multiple pixel values corresponding to all the different color channels of the color model. A dark channel may be related to a minimum value of the multiple pixel values, and the dark channel histogram may be a histogram of the dark channel of the image (or the target pixels, or the target pixel groups). For example, three pixels of the current image may exist in the target pixels, A(A1, A2, A3), B(B1, B2, B3), C(C1, C2, C3). A1, B1, and C1 may represent first channel values of a first channel (e.g., a red channel of the RGB color model, or a cyan channel of the CMYK or CMY color model). A2, B2, and C2 may represent second channel values of a second channel (e.g., a green channel, or a magenta channel of the CMYK or CMY color model), A3, B3, and C3 may represent a third channel value of a third channel (e.g., a blue channel, or a yellow channel of the CMYK or CMY color model). The statistic representation determination module 403 may determine a first minimum among A1, A2 and A3, a second minimum among B1, B2 and B3, and a third minimum among C1, C2 and C3. Then the statistic representation determination module 403 may determine the dark channel histogram based on the first minimum, the second minimum, and the third minimum.

It should be noted that the disclosure of determining the dark channel based on the minimum value of the multiple pixel values is not limited to the situations mentioned above. A person of ordinary skill in the art may modify the Operation 606 according to its specific features. In some embodiments, as described in Operation 604, the statistic representation determination module 403 may divide all the pixels of the current image or a portion of the plurality of pixels of the current image into different pixel groups to obtain the plurality of target pixels groups. For each of the at least partial of the target pixel groups, the statistic representation determination module 403 may determine a minimum value of the multiple pixel values of the pixels in the at least partial of the target pixel groups. In a certain target pixel group, the minimum value may be determined based on an absolute minimum value (a minimum among pixel values of different color channels) or an average minimum value (a minimum among average pixel values corresponding to different color channels). Then the statistic representation determination module 403 may determine the dark channel histogram based on the minimum values of the at least partial of the target pixel groups.

For example, at least portion of the current image is divided into three pixel groups A, B, and C. The pixel group A may include pixel A1 (A11, A12, A13), pixel A2 (A21, A22, A23), pixel A3 (A31, A32, A33). The pixel group B may include pixel B1 (B11, B12, B13), pixel B2 (B21, B22, B23), pixel B3 (B31, B32, B33). The pixel group C may include pixel C1(C11, C12, C13), pixel C2 (C21, C22, C23), pixel C3 (C31, C32, C33). A11, A21, A31, B11, B21, B31, C11, C21, and C31 may represent first channel values of a first channel (e.g., a red channel of the RGB color model, or a cyan channel of the CMYK or CMY color model). A12, A22, A32, B12, B22, B32, C12, C22, and C32 may represent second channel values of a second channel (e.g., a green channel, or a magenta channel of the CMYK or CMY color model). A13, A23, A33, B13, B23, B33, C13, C23, and C33 may represent a third channel value of a third channel (e.g., a blue channel, or a yellow channel of the CMYK or CMY color model). To determine the dark channel histogram, the statistic representation determination module 403 may determine a first minimum for pixel group A among A11, A12, A13, A21, A22, A23, A31, A32, and A33, a second minimum for pixel group B among B11, B12, B13, B21, B22, B23, B31, B32, and B33, and a third minimum for pixel group C among C11, C12, C13, C21, C22, C23, C31, C32, and C33, Then the statistic representation determination module 403 may determine the dark channel histogram based on the first minimum, the second minimum and the third minimum.

The statistic representation determination module 403 may also determine a first average of A11, A21, A31, a second average of A12, A22, A32, a third average of A13, A23, and A33, a fourth average of B11, B21, B31, a fifth average of B12, B22, B32, a sixth average of B13, B23, and B33, a seventh average of C11, C21, C31, an eighth average of C12, C22, C32, a ninth average of C13, C23, and C33. Then the statistic representation determination module 403 may determine the first minimum for pixel group A based on a minimum among the first average, the second average and the third average, determine the second minimum for pixel group B based on a minimum among the fourth average, the fifth average and the sixth average, and the third minimum for pixel group C based on a minimum among the seventh average, the eighth average and the ninth average. Then the statistic representation determination module 403 may determine the dark channel histogram based on the first minimum, the second minimum and the third minimum.

Figure 8A:
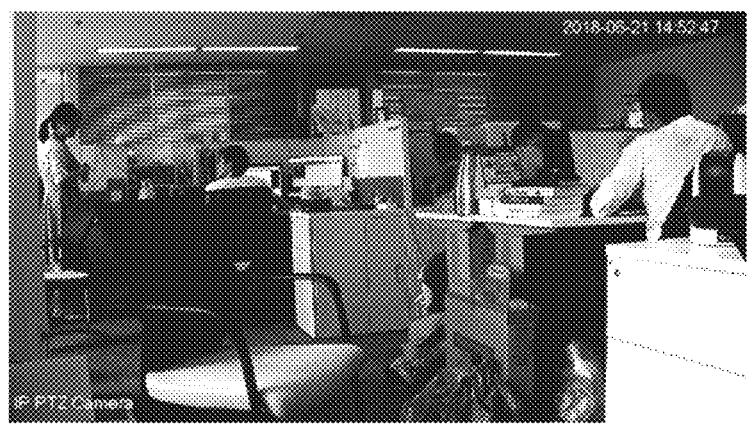
FIG. 8A is a first original colored image.
Figure 8B:
FIG. 8B is a first dark channel image corresponding to the original colored image of FIG. 8A.
Figure 8C:
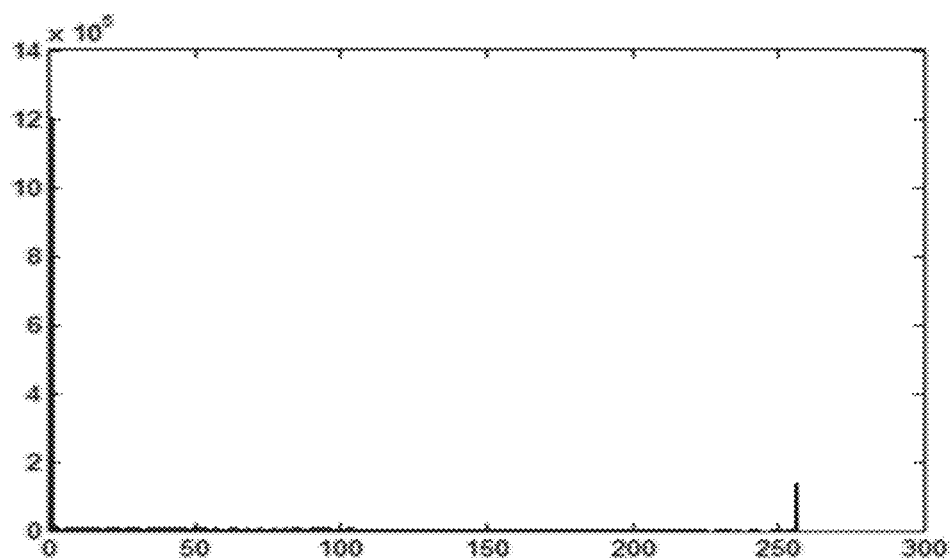
FIG. 8C is a first dark channel histogram of the dark channel image of FIG. 8B.

FIG. 8A is a first original colored image and FIG. 8B is a first dark channel image corresponding to the original colored image of FIG. 8A. The dark channel image is a grayscale image since pixel value of a pixel in the dark channel image is selected from the multiple pixel values (corresponding to multiple color channels) of a corresponding pixel in the original colored image. FIG. 8C is a first dark channel histogram of the dark channel image of FIG. 8B. The horizontal axis of a dark channel histogram represents the pixel value variations (e.g., 0-255), while the vertical axis represents the number of pixels in that particular pixel value.

Figure 9A:
FIG. 9A is a second original colored image and FIG. 9B is a second dark channel image corresponding to the original colored image of FIG. 9A.
Figure 9B:
Figure 9C:
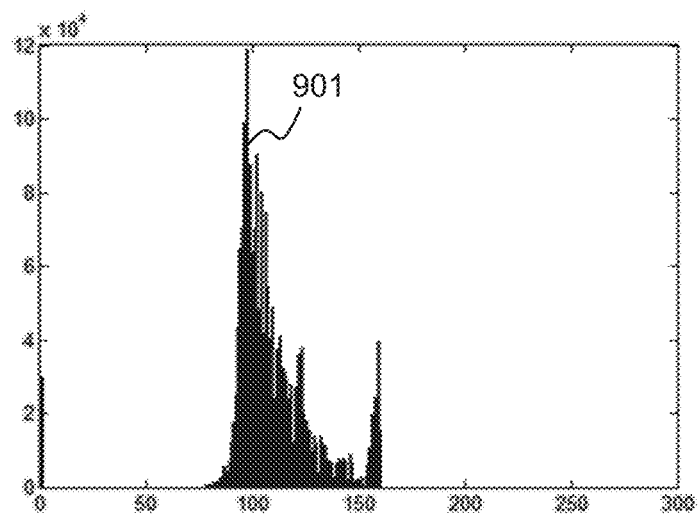
FIG. 9C is a first dark channel histogram of the dark channel image of FIG. 9B.

FIG. 9A is a second original colored image and FIG. 9B is a second dark channel image corresponding to the original colored image of FIG. 9A. FIG. 9C is a first dark channel histogram of the dark channel image of FIG. 9B.

The first original colored image and the second original colored image are generated under substantially the same environment (e.g., ambient light) for the substantially the same region (e.g., an office area). The first original colored image may be generated via a first optical parameter (e.g., an f4.0 aperture). The second original colored image may be generated via a second optical parameter (e.g., an f2.8 aperture). Compared to the second original colored image, contrast of the first original colored image is higher, thus the first original colored image has a better image quality.

In 608, the characteristic feature determination module 404 may determine a peak position value based on the dark channel histogram. A peak position may be a position on the horizontal axis of the dark channel histogram having the highest vertical axis value. The peak position value may be a pixel value of the peak position, which representing that the peak position value having the largest number of pixels in the dark channel image. As shown in FIG. 9O, the peak position may be the peak 901. The peak position value represents that pixel values of most of the pixels in the image approach the peak position value. Comparing the first second original image with the second original colored image, it may be noted that a higher contrast may be achieved if the peak position value is closer to 0. Thus, the peak position value of the current image obtained in Operation 602 may be controlled in a certain range or value, via controlling the exposure parameter related to the current image, to achieve a better image quality (e.g., a higher contrast).

The peak position value of an image may be adjusted by changing the exposure parameter of the image acquisition device 130. For example, by reducing the aperture of the image acquisition device 130, the peak position value may get lower, and the contrast of the image may get higher. By increasing the aperture of the image acquisition device 130, the peak position value may get higher, and the contrast of the image may get lower.

In 610, the updating module 405 may determine whether the peak position value is under a first threshold α. In a determination that the peak position value is not under the first threshold α, the updating module 405 may proceed to Operation 612 to determine that whether the the peak position value is under a second threshold β. In a determination that the peak position value is under the second threshold β, the updating module 405 may terminate the process 600 and output the current image.

In a determination that the peak position value is under the first threshold α, the updating module 405 may proceed to operation 616 to increase the aperture of the image acquisition device 130 to generate an updated image. Then the updating module 405 may proceed to Operation 620, a control model, to check whether the updated image is suitable to determine as the current image and go back to Operation 602 for an iterative update, or the current image is suitable for output.

In a determination that the peak position value is not under the second threshold 3, the updating module 405 may proceed to operation 618 to reduce the aperture of the image acquisition device 130 to generate the updated image. Then the updating module 405 may proceed to Operation 620, a control model, to check whether the updated image is suitable to determine as the current image and go back to Operation 602 for an iterative update, or the current image is suitable for output.

It should be noted that the above descriptions of process 600 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. For example, 602 and 604 may be performed at the same time. As another example, 606 and 608 may be integrated into an operation to adjust the imaging device based on the group of operation values of a set of exposure parameters. However, those variations and modifications also fall within the scope of the present disclosure.

Figure 7:
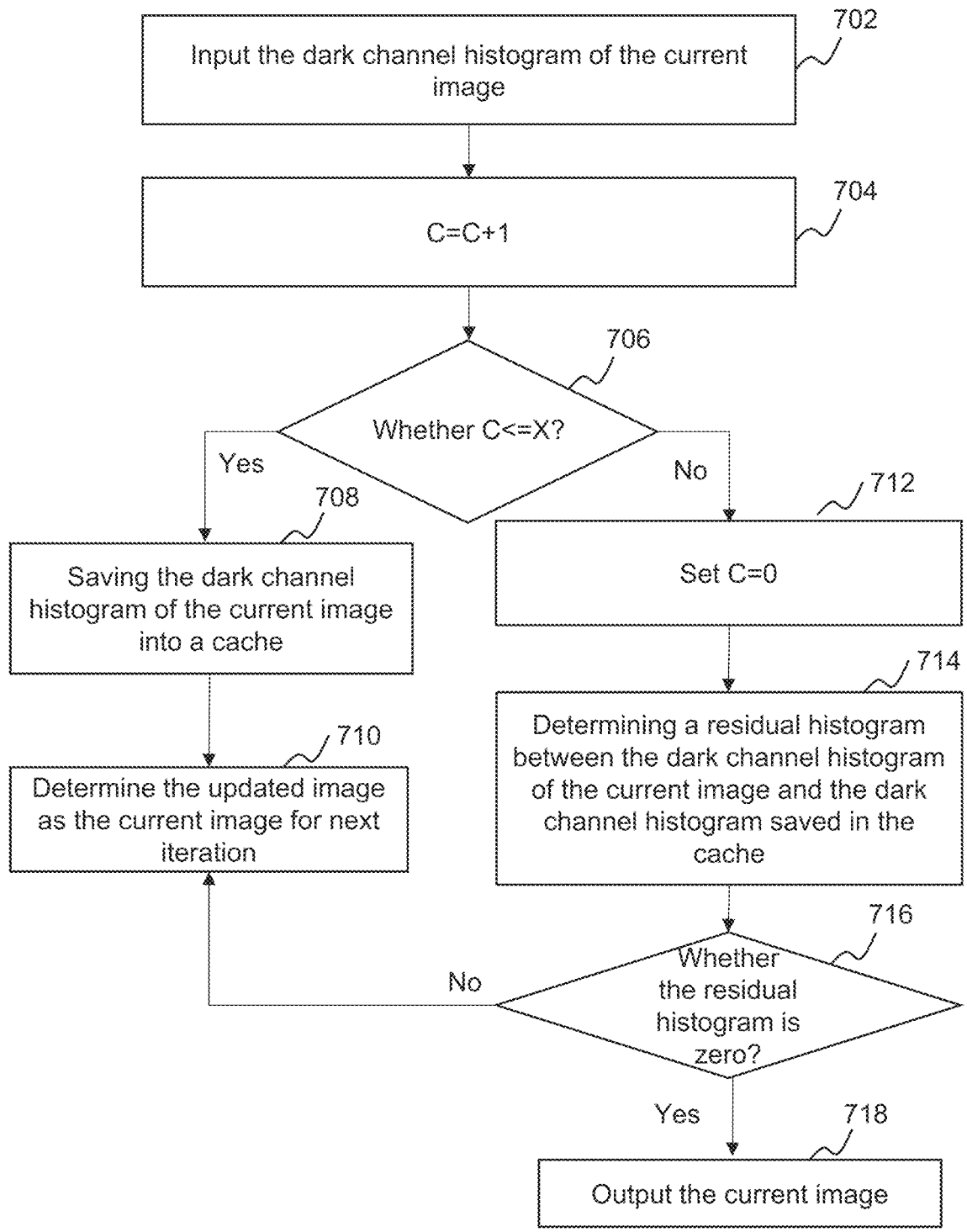
FIG. 7 is a flowchart illustrating an exemplary process for controlling the update process of the exposure parameter according to some embodiments of the present disclosure.

FIG. 7 is a flowchart illustrating an exemplary process for controlling the update process of the exposure parameter according to some embodiments of the present disclosure. In some embodiments, the process 700 may be implemented in the processing engine 112 illustrated in FIG. 1 or the processing device 340 illustrated in FIG. 3. For example, the process 700 may be stored in the storage 140, in the storage 203 and/or the storage device 350 as a form of instructions and invoked and/or executed by the processing engine 112 or the processing device 340 (e.g., the processor 201 illustrated in FIG. 2). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the updating module 405 may obtain a dark channel histogram of the current image obtained in the process 600. In 704, the updating module 405 may set a counter C for the iteration process, and the counter may be set as zero initially. For each iteration, the value of the counter C may be increased by one. In 706, the updating module 405 may determine whether the counter is more than an iteration number X. To prevent an infinite iteration, the process may terminate the iterative process when the counter exceeds the iteration number X (e.g., 15). In a determination that the counter is not more than the iteration number X, in 708, the updating module 405 may save the dark channel histogram of the current image into a cache. In 710, the updating module 405 may determine the updated image, generated by reducing or increasing the aperture in the Operation 616 or 618 of process 600, as the current image for next iteration. The updated may be determine as the current image in Operation 602 of the process 600, and the process 700 may proceed to Operation 602 for next iteration.

In some embodiments, in Operation 708, the updating module 405 may not save the dark channel histogram of the current image into the cache until the iteration number X equals to the counter C. Thus, for an X times iteration, the residual histogram is determined based on the dark channel histograms generated in last two iterations.

In a determination that the counter is more than the iteration number X, in 712, the updating module 405 may empty the counter and set the counter as zero. In 714, the updating module 405 may determine a residual histogram between the dark channel histogram of the current image and the dark channel histogram saved in the cache (the dark channel histogram coming from last iteration). The residual histogram may be determined based on a difference between the dark channel histogram of the current image and the dark channel histogram saved in the cache. In 716, the updating module 405 may determine whether the residual histogram approaches to zero. In a determination that the residual histogram substantially approaches to zero, in 718, the updating module 405 may output the current image. In a determination that the residual histogram substantially does not approach to zero, the process may proceed to operation 710.

In some embodiments, the updating module 405 may also determine whether the residual histogram conforms to a priori distribution (e.g., a linear distribution, a Gaussian distribution) in Operation 716. In a determination that residual histogram conforms to a priori distribution, in 718, the updating module 405 may output the current image. In a determination that the residual histogram does not conform to a priori distribution, the process may proceed to operation 710.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure. In some embodiments, one or more operations may be added or omitted. In some embodiments, the order of two or more operations may be changed. However, those variations and modifications also fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An imaging control method, comprising:
    obtaining a current image generated based on an exposure parameter, wherein the current image includes a plurality of pixels;
    determining a plurality of target pixels or target pixel groups from at least portion of the plurality of pixels;
    determining a statistic representation based on the plurality of target pixels or the target pixel groups;
    determining a characteristic feature based on the statistic representation; and
    updating the exposure parameter, based on the characteristic feature, to generate an updated image, wherein determining the statistic representation comprises:
        for each of the target pixel groups, determining a plurality of average pixel values corresponding to a plurality of different color channels, wherein for a target pixel group, a target channel value is the minimum value among the plurality of average pixel values of the target pixel group.

2. The method of claim 1, wherein a pixel of the plurality of pixels includes multiple pixel values corresponding to different color channels, and the statistic representation is related to a minimum value of the multiple pixel values.

3. The method of claim 1, wherein the exposure parameter includes at least one of an aperture of an image capture device, a shutter of the image capture device, a parameter related to photosensibility of the image capture device, or an exposure value of the image capture device.

4. The method of claim 1, wherein the statistic representation is a histogram.

5. The method of claim 4, wherein the characteristic feature relates to a peak of the histogram.

6. The method of claim 1, wherein updating the exposure parameter based on the characteristic feature to generate an updated image further comprises:
    changing the exposure parameter to make the characteristic feature within a preset range.

7. The method of claim 6, wherein changing the exposure parameter to make the characteristic feature within a preset range further comprises:
    determining whether the characteristic feature satisfies a first condition;
    in a determination that the characteristic feature does not satisfy the first condition, reducing the exposure parameter based on an optical metric.

8. The method of claim 7, wherein changing the exposure parameter to make the characteristic feature within a preset range further comprises:
    determining whether the characteristic feature satisfies a second condition;
    in a determination that the characteristic feature does not satisfy the second condition, increasing the exposure parameter based on the optical metric.

9. The method of claim 1, wherein updating the exposure parameter is an iteration process, and the method further comprises:
    updating the exposure parameters based on a difference between a first statistic representation of a first iteration and a second statistic representation of a second iteration.

10. A system configured to control imaging process, comprising:
    at least one non-transitory storage medium including a set of instructions; and
    at least one processor in communication with the at least one non-transitory storage medium, wherein when executing the set of instructions, the at least one processor is configured to direct the system to:
        obtain a current image generated based on an exposure parameter, wherein the current image includes a plurality of pixels;
        determine a plurality of target pixels or target pixel groups from at least portion of the plurality of pixels;
        determine a statistic representation based on the plurality of target pixels or the target pixel groups;
        determine a characteristic feature based on the statistic representation; and
        update the exposure parameter, based on the characteristic feature, to generate an updated image, wherein to determine the statistic representation, the at least one processor is configured to direct the system to:
            for each of the target pixel groups, determine a plurality of average pixel values corresponding to a plurality of different color channels, wherein for a target pixel group, a target channel value is the minimum value among the plurality of average pixel values of the target pixel group.

11. The system of claim 10, wherein a pixel of the plurality of pixels includes multiple pixel values corresponding to different color channels, and the statistic representation is related to a minimum value of the multiple pixel values.

12. The system of claim 10, wherein the exposure parameter includes at least one of an aperture of an image capture device, a shutter of the image capture device, a parameter related to photosensibility of the image capture device, or an exposure value of the image capture device.

13. The system of claim 10, wherein the statistic representation is a histogram related to the channel value set.

14. The system of claim 13, wherein the characteristic feature relates to a peak of the histogram.

15. The system of claim 10, wherein to update the exposure parameter based on the statistic representation to generate an updated image, the system is further configured to:
    change the exposure parameter to make the characteristic feature within a preset range.

16. The system of claim 15, wherein to change the exposure parameter to make the characteristic feature within a preset range, the system is further configured to:
    determine whether the characteristic feature satisfies a first condition;

in a determination that the characteristic feature does not satisfy the first condition, reduce the exposure parameter based on an optical metric.

17. The system of claim 16, wherein to change the exposure parameter to make the characteristic feature within a preset range, the system is further configured to:
   determine whether the characteristic feature satisfies a second condition;
   in a determination that the characteristic feature does not satisfy the second condition, increase the exposure parameter based on the optical metric.

18. A non-transitory computer readable medium comprising executable instructions that, when executed by at least one processor, cause the at least one processor to effectuate a method comprising:
   obtaining a current image generated based on an exposure parameter, wherein the current image includes a plurality of pixels;
   determining a plurality of target pixels or target pixel groups from at least portion of the plurality of pixels;
   determining a statistic representation based on the plurality of target pixels or the target pixel groups;
   determining a characteristic feature based on the statistic representation; and
   updating the exposure parameter, based on the characteristic feature, to generate an updated image, wherein determining the statistic representation comprises:
      for each of the target pixel groups, determining a plurality of average pixel values corresponding to a plurality of different color channels, wherein for a target pixel group, a target channel value is the minimum value among the plurality of average pixel values of the target pixel group.

* * * * *